(12) United States Patent
Stienhans et al.

(10) Patent No.: US 8,290,998 B2
(45) Date of Patent: Oct. 16, 2012

(54) SYSTEMS AND METHODS FOR GENERATING CLOUD COMPUTING LANDSCAPES

(75) Inventors: Frank Stienhans, San Mateo, CA (US); Krupakar Manthani, Santa Clara, CA (US); Michael Klimentiev, Belmont, CA (US); Asen Petrov, Mountain View, CA (US)

(73) Assignee: SAP AG, Walldorf (DE)

( * ) Notice: Subject to any disclaimer, the term of this patent is extended or adjusted under 35 U.S.C. 154(b) by 396 days.

(21) Appl. No.: 12/469,387

(22) Filed: May 20, 2009

(65) Prior Publication Data

US 2010/0299366 A1     Nov. 25, 2010

(51) Int. Cl.
*G06F 12/00* (2006.01)
(52) U.S. Cl. .................. 707/827; 707/831; 709/203
(58) Field of Classification Search .................. None
See application file for complete search history.

(56) References Cited

U.S. PATENT DOCUMENTS

| | | | | |
|---|---|---|---|---|
| 4,558,905 A | * | 12/1985 | Natori | 297/452.6 |
| 5,848,415 A | * | 12/1998 | Guck | 707/831 |
| 6,336,120 B1 | * | 1/2002 | Noddings et al. | 707/829 |
| 6,356,915 B1 | * | 3/2002 | Chtchetkine et al. | 707/823 |
| 6,789,094 B2 | * | 9/2004 | Rudoff et al. | 707/797 |
| 7,231,400 B2 | * | 6/2007 | Cameron et al. | 707/829 |
| 7,266,555 B1 | * | 9/2007 | Coates et al. | 707/827 |
| 7,269,613 B2 | * | 9/2007 | Sasaki et al. | 707/781 |
| 7,370,695 B2 | * | 5/2008 | Haglsperger et al. | 165/202 |
| 7,720,892 B1 | * | 5/2010 | Healey et al. | 707/831 |
| 2009/0139973 A1 | * | 6/2009 | Hung | 219/202 |
| 2009/0276771 A1 | * | 11/2009 | Nickolov et al. | 717/177 |
| 2010/0306686 A1 | * | 12/2010 | Rafes et al. | 715/765 |

OTHER PUBLICATIONS

Amazon Web Services (TM) "Amazon Elastic Compute Cloud," Developer Guide, API Version Aug. 8, 2008.

* cited by examiner

*Primary Examiner* — Christyann Pulliam
*Assistant Examiner* — Daniel Kuddus
(74) *Attorney, Agent, or Firm* — Fountainhead Law Group PC (57) ABSTRACT

In one embodiment, the present invention includes a computer-implemented method comprising specifying a landscape definition, the landscape definition specifying a plurality of different servers to be instantiated on a cloud computing system, wherein the plurality of servers are operable to work together as a single logical entity, the landscape definition further specifying dependencies between the servers, and wherein each server in the landscape definition is stored as an image on the cloud computing system, each image including information for instantiating a corresponding server on the cloud computing system and instantiating the plurality of servers on the cloud computing system using the landscape definition.

18 Claims, 6 Drawing Sheets

SYSTEMS AND METHODS FOR GENERATING CLOUD COMPUTING LANDSCAPES

BACKGROUND

The present invention relates to computing, and in particular, to a systems and methods for generating cloud computing landscapes.

In general, the concepts of "virtual" and "cloud computing" includes the utilization of a set of shared computing resources (e.g., servers) which are typically consolidated in one or more data center locations. For example, cloud computing systems may be implemented as a web service that enables a user to launch and manage computing resources (e.g., virtual server instances) in third party data centers. In a cloud environment, computer resources may be available in different sizes and configurations so that different resource types can be specified to meet specific needs of different users. For example, one user may desire to use small instance as a web server and another larger instance as a database server, or an even larger instance for processor intensive applications. Cloud computing offers this type of outsourced flexibility without having to manage the purchase and operation of additional hardware resources within an organization.

A cloud-based computing resource is thought to execute or reside somewhere on the "cloud", which may be an internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce disruption due to an application or hardware failure.

A variety of different computing resources may be created on a cloud. For example, a resource may include all the information necessary to run application software, and may include UNIX, Linux, or Windows operating systems and specific application software as desired by a user. The information for configuring the resource to be created is referred to as an image. After an image has been created (instantiated), the resource becomes an instance (a server instance).

Figure 1:
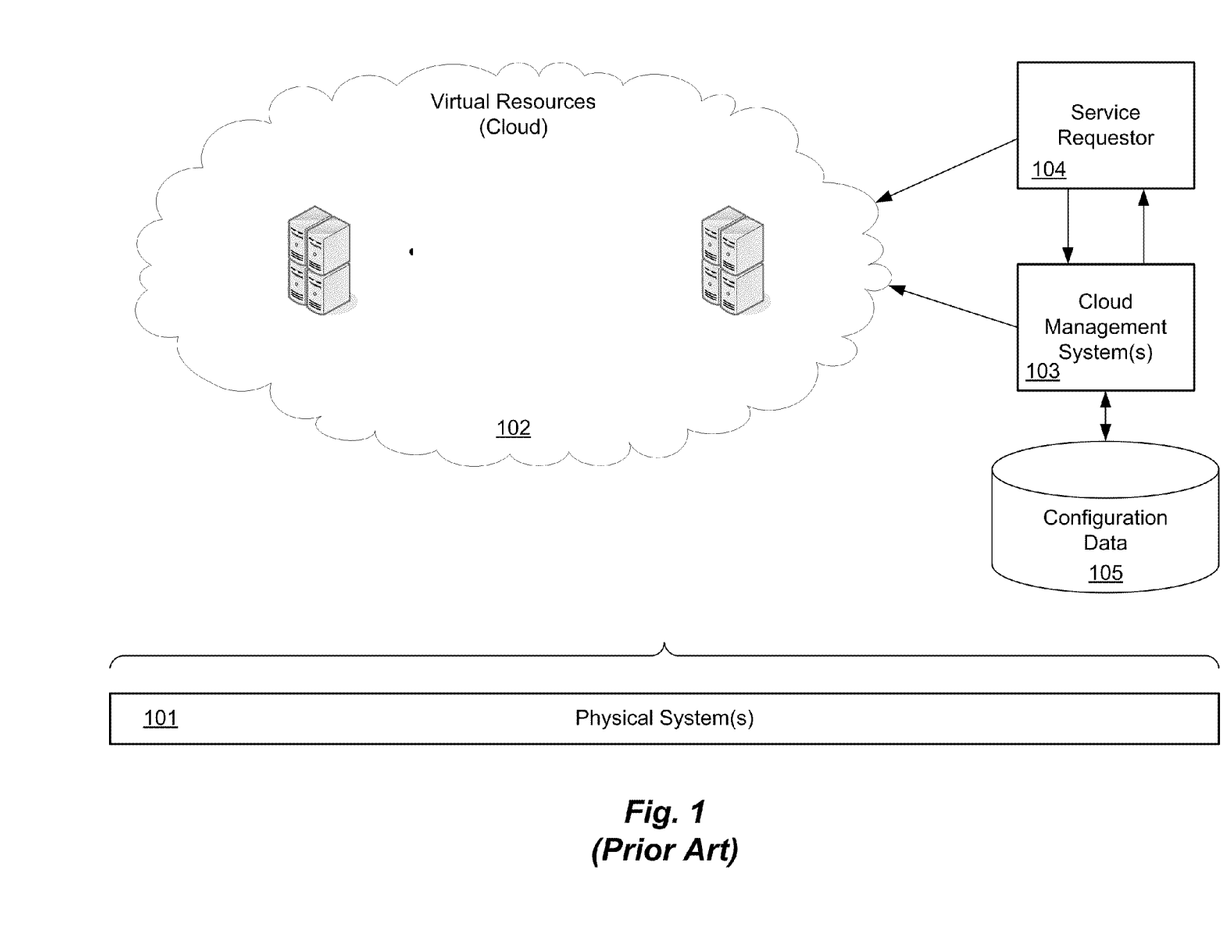
FIG. 1 shows an example cloud computing architecture.

FIG. 1 illustrates a typical cloud computing architecture. A service requester 104 may desire to use computing resources available on the cloud 102. As mentioned above, physically, the cloud may be one or more physical computer networks (e.g., server farms) accessible over the Internet, for example, with software for creating resource images and instances desired by users. One such cloud computing system is offered by Amazon.com®. Before a cloud computing resource can be created and used, a user must typically configure the particular resource. For example, in the case of a virtual server or virtual appliance, a user must configure the server or appliance and provision a physical server to execute the virtual server or appliance. Service requester 104 may send messages to a cloud management system 103 to create or access configuration information for creating resources on cloud 102. In response to such messages, cloud management system 103 may configure a virtual server or virtual appliance for use by a requesting user. As illustrated in FIG. 1, the cloud management system 103 may act as an interface, whereby one or more users may setup resources on the cloud. For example, cloud management system 103 may facilitate web-based access to various administrative functions thereby enabling the user to configure the cloud-based resource using a conventional web browser application. For instance, the management system 103 may display to the user a list of resources or services that the user can utilize, along with a list of commands (e.g., start, stop, suspend, list) that can be executed to operate on, or with, certain resources. As mentioned above, the cloud-based resources may comprise, for example, a list of preconfigured or customized machine images corresponding to virtual servers that can be instantiated in the cloud. The management systems may manage the available resources, including the physical servers.

As illustrated in FIG. 1, cloud management system 103 may use configuration data 105 for setting up computing resources for different users. The configuration data may specify the details of the computing resources to be allocated, such as the image to be instantiated and the amount of computing resources to be applied. For instance, a user may upload a customized machine image or select a pre-configured machine image. The management system may store configuration data 105 in a repository, for example. When the user desires to use the resources, the system may generate the necessary commands for instantiating the virtual server on the appropriate physical server. For example, if a user desires a small amount of resources, the user may direct management system 103 to access configuration data specifying an image including a virtual CPU having a certain processing power and specifications, 1 GB of memory, and 100 GB of persistent storage. However, if the user desires a large amount of resources, the user may direct management system 103 to access configuration data specifying an image including multiple virtual CPUs having a certain processing power, 10 GB of memory, and 500 GB of persistent storage. The images are used to create server instances of the specified resources. Once the resources are instantiated, a link to the resources is sent to the user (e.g., an IP address) and the user may access the resources to run software applications as desired.

There are a number of problems with the existing tools and techniques for provisioning resources in a computing cloud. In particular, cloud computing systems typically store servers as individual images and require that each individual servers be brought on-line separately. However, in many cases, servers act as components of a larger software system or architecture. Such servers are required to interface with other servers in the system to function properly. One example of such a system of servers (or landscape) may include a database server, J2EE server, and a web server. Implementing a landscape on a cloud can be difficult because of the complex interrelationships between the servers. Currently, there is no efficient and seemless mechanism for implementing a landscape on a cloud computing system. Consequently, there exists a need for improved systems and methods for generating cloud computing landscapes.

SUMMARY

Embodiments of the present invention include systems and methods for generating cloud computing landscapes. In one embodiment, the present invention includes a computer-implemented method comprising specifying a landscape definition, the landscape definition specifying a plurality of different servers to be instantiated on a cloud computing system, wherein the plurality of servers are operable to work together as a single logical entity, the landscape definition further specifying dependencies between the servers, and wherein each server in the landscape definition is stored as an image on the cloud computing system, each image including information for instantiating a corresponding server on the cloud computing system and instantiating the plurality of servers on the cloud computing system using the landscape definition.

The following detailed description and accompanying drawings provide a better understanding of the nature and advantages of the present invention.

DETAILED DESCRIPTION

Described herein are techniques for generating cloud computing landscapes. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 2:
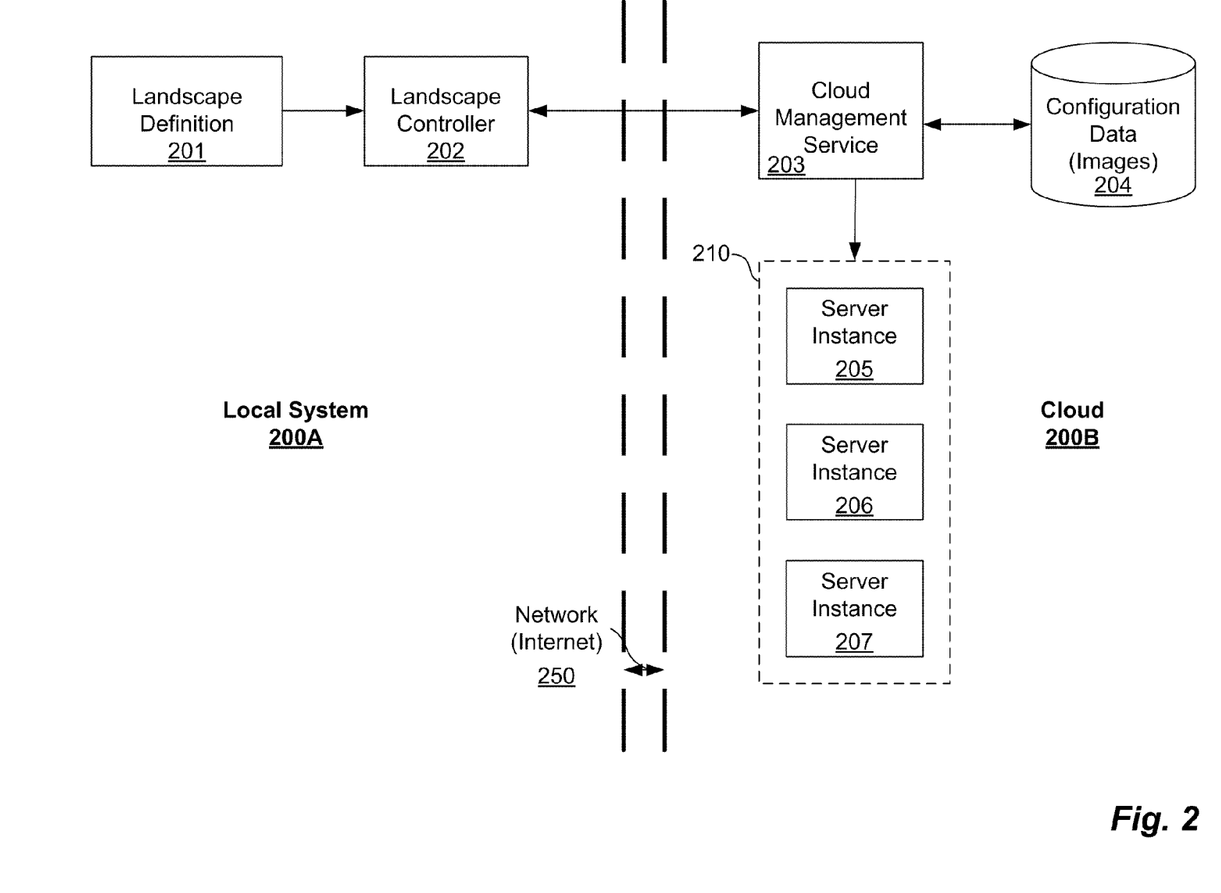
FIG. 2 illustrates generating a landscape on a cloud computer system according to one embodiment of the present invention.

FIG. 2 illustrates generating a landscape on a cloud computer system according to one embodiment of the present invention. In FIG. 2, a local computer system 200A is coupled to a cloud computing system 200B over a network 250. The local computer system 200A and cloud computer system 200B each may include multiple computer systems, such as server computers, configured in a network. FIG. 2 illustrates the computer software on the local system 200A and the cloud 200B running on underlying computer hardware (not shown). The local system 200A may be coupled to the cloud 200B over the Internet, for example. Features and advantages of the present invention include generating landscapes including multiple servers on cloud 200B. A landscape may refer to multiple servers working together as a single logical entity.

For instance, a landscape may include a plurality of different servers providing a single logical service. Additionally, the landscape may be a cluster of interdependent software servers, where at least one server is dependent on another server in the landscape. Accordingly, servers in a landscape may be functionally dependent on each other to work together. One example of a landscape is a database server, a J2EE server, and a web server. Another more specific example may be an Enterprise Resource Planning ("ERP") server, a Customer Relationship Management ("CRM") server, and a Web Portal server, where the Web Portal allows users to access the other servers over the Web, for example.

In one embodiment, landscapes may be defined and implemented using a landscape definition 201. The landscape definition 201 may specify a plurality of different servers to be instantiated on the cloud computing system 200B. In this example, landscape definition 201 may be received in a landscape controller software component 202. Landscape controller 202 may read (e.g., parse) the landscape definition 201 and establish communications with cloud management service 203 on cloud 200B for creating the landscape. Cloud 200B may store multiple different server images 204 (e.g., in a repository). The different server images 204 include information for creating (instantiating) different executable software servers on the physical cloud computers 200B. Landscape controller 202 may receive the landscape definition 201 and send information to cloud management service 203 to access particular pre-stored images 204 on the cloud 200B and instantiate the images as executable software servers 205, 206, and 207 (i.e., server instances), which form a single landscape 210. Landscape controller 202 may receive multiple landscape definitions and support creation and management of many different landscapes simultaneously. Features and advantages of the present invention include providing a user with a single point for creating, managing, and/or operating on landscapes on a cloud computer system. Accordingly, users may create and manipulate a software system including multiple interdependent servers as a single unit on a cloud computing system, rather than being required to separately and individually instantiate the different servers on the cloud and manually configure each separate server on the cloud to work with each other server in the system.

Additionally, the landscape definition 201 may further specify dependencies between the servers. One example of such dependencies includes dependencies relating to a startup sequence carried out when the servers are instantiated. As separate servers in a landscape are instantiated and started, different servers may be dependent on other servers to perform the startup process. In one embodiment, dependencies are specified in the landscape definition 201, and the specified dependencies include a startup sequence for two or more of the servers. Accordingly, instantiating the servers on the cloud computing system includes instantiating two or more servers according to the startup sequence specified in the landscape definition.

In one embodiment, the landscape definition 201 associates a plurality of servers with a landscape identification (landscape id) and, for each server, specifies different server configuration parameters to be used in instantiating the plurality of servers on the cloud computing system. The following is an example of a landscape definition implemented in XML and specifying a startup sequence according to one embodiment of the present invention:

```xml
<?xml version="1.0" ?>
- <ISA>
    - <Landscape name="DemoServer"
        description="Demo Server">
        - <Servers>
            - <Server id="s1" imageid="ami-51d13538"
                description="server1">
                <Param name="p1" reference="s2" />
            </Server>
            <Server id="s2" imageid="ami-d6c125bf"
                description="server2" />
            <Server id="s3" imageid="ami-df30d5b6"
                description="server3" />
        </Servers>
    </Landscape>
</ISA>
```

This example illustrates an example landscape named "DemoServer" having three (3) separate servers stored as three (3) different images on a cloud computer system. The landscape name in this example may act as the landscape id. For each server in the landscape, the landscape definition specifies a unique server identification ("Server_id"), a unique image identification ("imageid") that specifies the image on the cloud to instantiate, and a description (e.g., "server1", "server2", "server3"). Additionally, dependencies are included in the landscape definition. In this example, server "s1" further includes parameters to specify the dependencies. Here, the parameters "Param name='p1' reference='s2'" indicate that server "s1" is dependent upon server "s2". These parameters may be sent to the cloud and to the respective servers when each is created. As an example, if server "s1" is dependent upon server "s2", then server "s1" may not be able to complete its startup process until server "s2" has completed some or all of its startup process.

Figure 3:
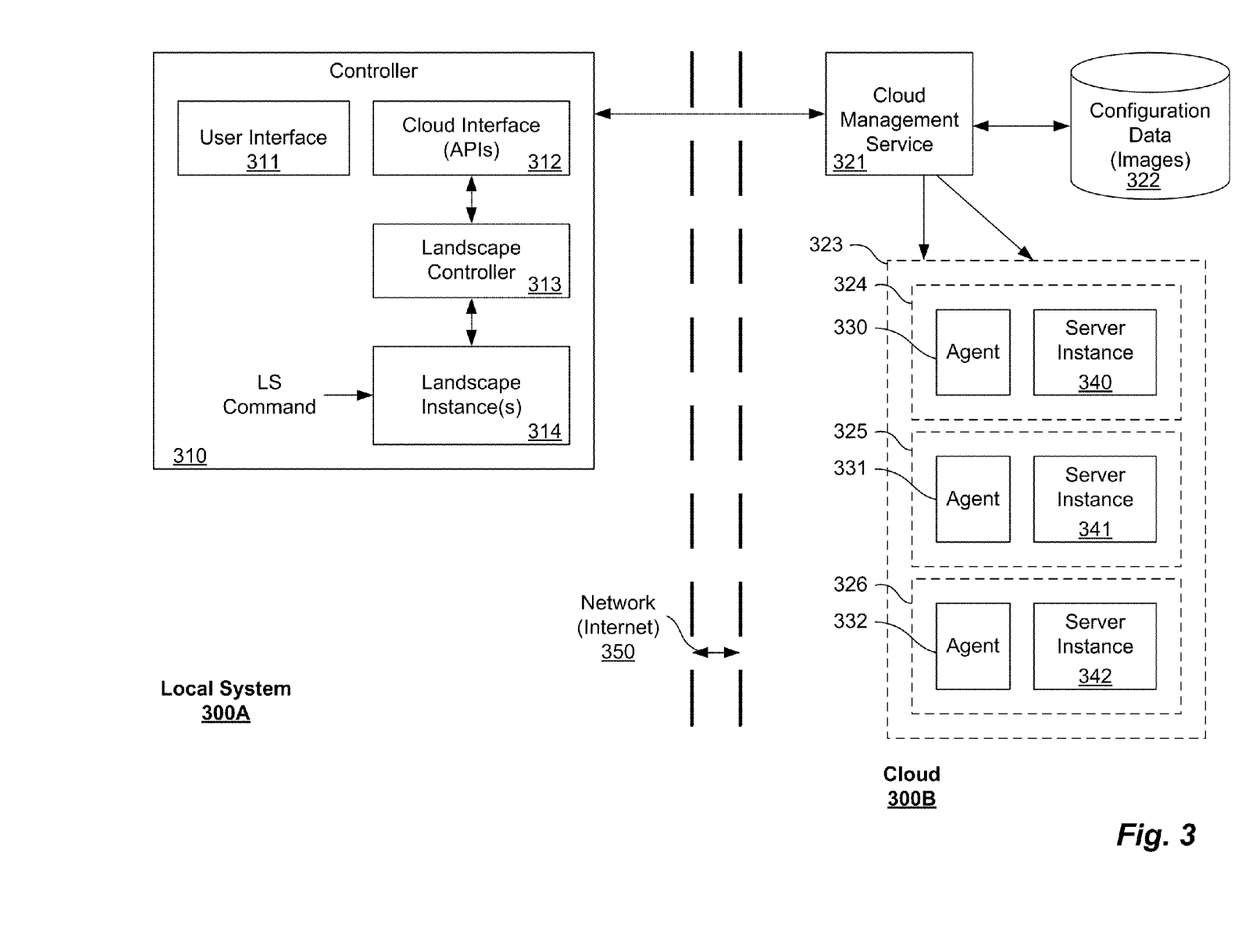
FIG. 3 illustrates generating a landscape on a cloud computer system according to another embodiment of the present invention.

FIG. 3 illustrates generating a landscape on a cloud computer system according to another embodiment of the present invention. In this example, a local computer system 300A includes a controller software program 310 for generating landscapes on a cloud computer system 300B. Controller 310 may include, for example, a user interface software component 311, a cloud interface software component 312, a landscape controller 313, and one or more landscape instances 314. Controller 310 may send and receive information to and from a cloud management service 321 on cloud computer system 300B for creating the one or more landscapes on the cloud. As an example, user interface 311 may be a web based user interface to allow users to create a landscape and specify parameters for each of the servers in the landscape definition. Using a web based interface, a user may specify particular servers to be part of a landscape definition. Additionally, for each server in the landscape definition, the user may specify specific server configuration parameters to be used by each server. Once a landscape definition is specified, the landscape definition may be received by the landscape controller 313. Landscape controller 313 parses the landscape definition and extracts information for use in creating each server in the landscape. From the example landscape definition set forth above, the landscape controller 313 may extract an image id, server id (e.g., a name), and dependencies, for example. This information may be sent to cloud interface 312 and forwarded to cloud management service 321. Cloud management service 321 may access each image 322 specified in the landscape definition and instantiate the image. In this example, server instances 340, 341, and 342 are instantiated as part of a single landscape 323 on cloud 300B.

Landscape controller 313 may further generate a landscape instance 314. For example, after a landscape is defined, a user may launch the landscape on the cloud by issuing a "create" landscape command. Locally, landscape controller 313 may generate a landscape instance 314 for each landscape created on cloud 300B. The landscape instance 314 on local computing system 300A may be used for controlling the plurality of servers in the landscape definition. For example, in many cases it may be desirable to issue commands to the landscape as a whole. Particular landscape commands may include create, kill, suspend, or resume, for example. Embodiments of the present invention may receive a landscape command directed to the landscape instance 314 and map the landscape command to a plurality of server commands corresponding to the plurality of servers in the landscape definition. The server commands are then executed on the servers associated with the landscape definition on the cloud computing system. For example, if a user (e.g., a system administrator) issues a suspend command to a particular landscape, the landscape command ("LS Command" in FIG. 3) may be received by the landscape instance 314 for the particular landscape. Landscape instance 314 may automatically translate the command into separate server commands directed toward each server. The landscape instance 314 may forward the separate server commands through cloud interface 312, for example, to the server instances on the cloud for execution. In one embodiment, each landscape instance establishes a connection with each server in the landscape definition and commands are forwarded directly to the servers on the cloud.

Additionally, each landscape may be assigned a unique identifier (i.e., a landscape identifier) and such identifier may be associated with the landscape instance 314. Each landscape identifier may be associated with the different servers that make up the landscape definition. The unique identifier may be stored in a database and associated with information about the servers that make up the landscape definition so that such information may be used to control the different servers in the landscape and/or provide information to a user about each landscape, for example.

In one embodiment, each image stored in the cloud computing system further includes an agent software program, and the agent establishes communication between the cloud computing system 300B and a local computing system 300A. For example, the images 322 may include information for instantiating both a server and an agent. As illustrated in FIG. 3, when server images 340, 341, and 342 for landscape 323 are instantiated, agent software programs 330, 331, and 332 are also instantiated for each server. The server-agent pairs form composite software components 325, 326, and 327 that may be implemented on different computer systems within the cloud 300B. In one embodiment, the agents may coordinate communications between the servers during a startup procedure. For instance, when each server is first created, the servers may have no information about where in the cloud computing system the other servers in the landscape are located or how to communicate with them. Accordingly, agents 330, 331, and 332 are used to establish connectivity between the different servers. As described in more detail below, one embodiment of the invention includes a registration process, where each agent forwards information to the local computer system specifying the location of the corresponding server, and the information is distributed to the other systems as needed.

EXAMPLES

Figure 4:
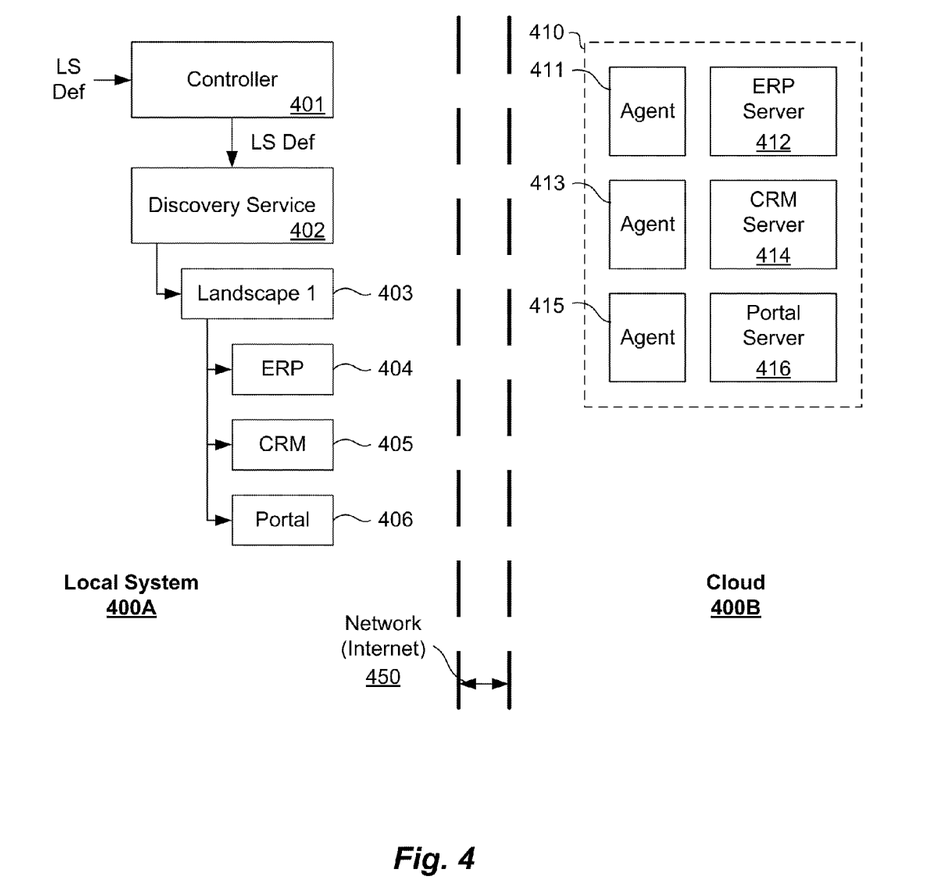
FIG. 4 illustrates coordinating cloud resources according to another embodiment of the present invention.
Figure 5:
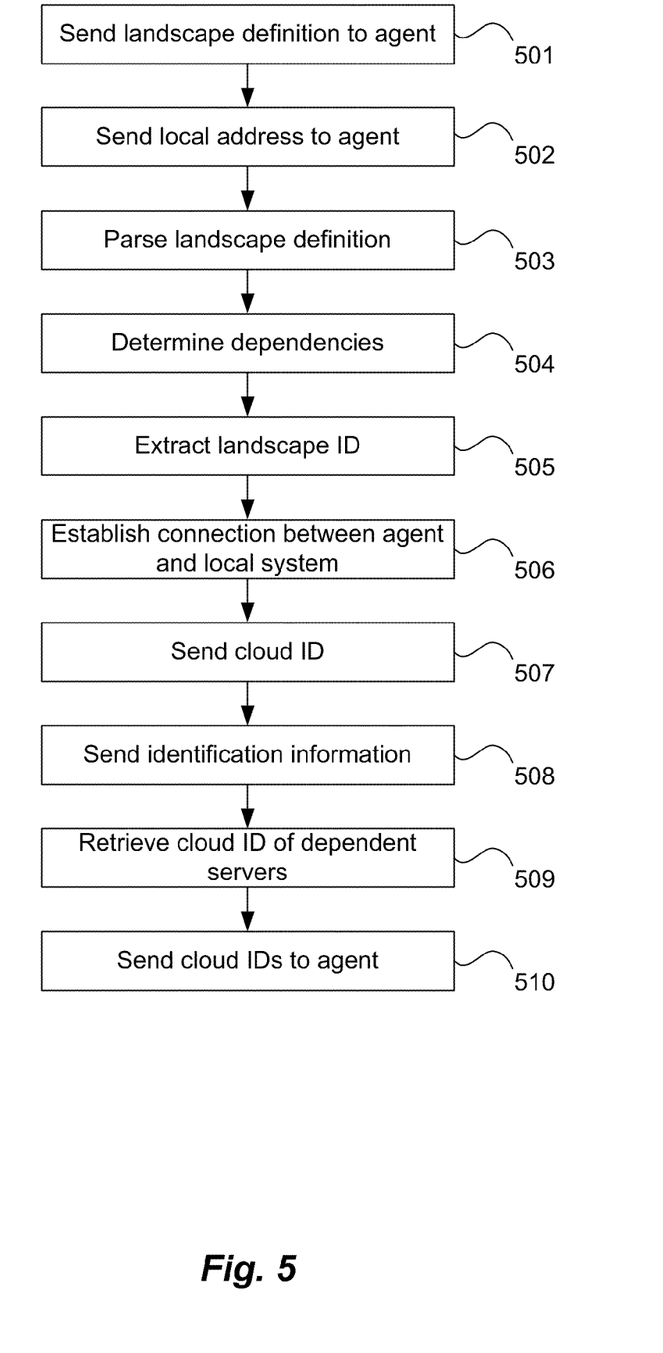
FIG. 5 illustrates a method of coordinating landscape resources on a cloud according to one example embodiment of the invention.

FIG. 4 illustrates another embodiment of the present invention. In this example, a landscape definition is received by a controller 401. Controller 401 sends the landscape definition to a discovery service 402. Discovery service 402 may be used to coordinate the startup of the separate cloud server instances. Discovery service 402 may be a software component implemented in the controller, as part of a landscape instance, or as a stand-alone component, for example. Discovery service 402 may receive the landscape definition and create a registry for the landscape, including registry entries for each server defined in the landscape, for example. FIG. 5 illustrates a method of coordinating landscape resources on a cloud according to one example embodiment of the invention. For instance, after the server images are instantiated on the cloud as servers and agents, each of the servers must determine where the other servers are on the cloud according to dependencies. The following process may occur as each server-agent on the cloud is being instantiated and performing a startup process. At 501, the landscape definition is sent to each agent on the cloud. Additionally, as illustrated at 502, a local address (e.g., the address of the discovery service in the local computing system 400A) is sent to each agent on the cloud. The agents may use the local address to connect to the discovery service, for example. At 503 each agent parses the landscape definition. At 504, each agent determines the dependencies of the landscape servers from the landscape definition. Each agent may further extract the landscape ID as illustrated at 505. Using the local address, each agent may connect to the discovery service, for example, as shown at 506. Each agent may send the cloud ID of the associated server to the discovery service at 507. For example, agent 411 may obtain the cloud ID for server 412. The cloud ID may be used to access server 412. Agent 411 may send the cloud ID for server 412 to the discovery service 402. Similarly, agent 413 may obtain the cloud ID for server 414 and send the cloud ID to the discovery service 402. Likewise, agent 415 may obtain the cloud ID for server 416 and send the cloud ID to the discovery service 402. Each agent may further send identification information to the discovery service as illustrated at 508. For example, an agent associated with an ERP server may send information to indicate that the server is an ERP server, for example. Other agents may similarly send identification information the particular server the agent is associated with. Identification information may include the landscape ID, so that the discovery service knows which landscape a particular agent is associated with. The cloud IDs and identification information of dependent servers may be retrieved by each agent at 509 and such information is sent back to the agents at 510. Management of the information from the agents may be controlled using a registry as will now be described.

The discovery service 402 may generate a registry entry based on the landscape definition. For example, discovery service 402 may generate landscape registry entry 403. If the landscape definition includes an ERP server, CRM server, and Portal server, as in this example, the landscape registry entry 403 may include entries for each server as shown at 404-406. As information from each agent is received, as described above, data from the agent is associated with each entry. For example, when information is received from agent 411 (i.e., the ERP server), landscape ID may be used to determine which landscape registry to access (e.g., landscape registry entry 403). The information specifying that the agent is attached to the ERP server may be used by the discovery server to determine the appropriate server in the registry. Here, registry entry 404 corresponds to the ERP server, therefore, this registry would be accessed. Next, registry entry 404 corresponding to the ERP server is updated to store the cloud ID for server 412 and may further include status information, such as whether or not the system is fully up and running, for example. If server 412 is dependent on server 414 for completing the startup process, then agent 411 may check the registry entry 405 to determine the location and status of server 414. However, if the agent for server 414 has not started, no information will be available and agent 411 may wait and continue to check at periodic intervals. When the cloud ID and identification information from agent 413 is received, such information is stored in the registry 405. If server 414 is dependent on server 412, agent 413 may retrieve and check the information in registry 404. In this case, the registry indicates the cloud ID for accessing server 412 and that server 412 is up and running. Accordingly, agent 413 may send the cloud ID for accessing server 412 to server 414 so that server 414 may access server 412 and complete the startup process. At some later time, agent 411 may access the information from registry 405 (e.g., the cloud ID and status) and, now that server 414 is running and registered, may forward the cloud ID of server 414 to server 412 so that server 412 may access server 414 and complete the startup process.

Figure 6:
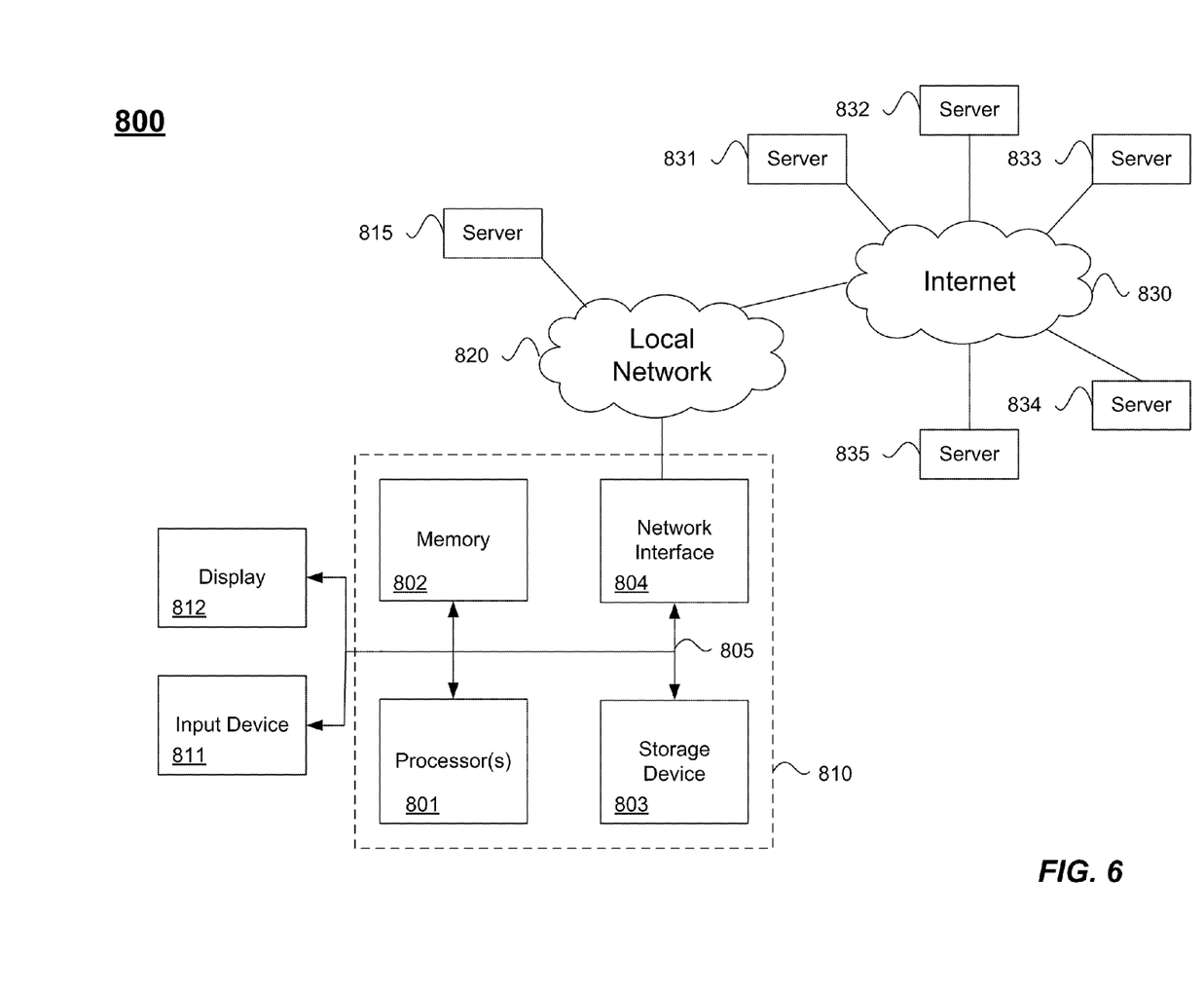
FIG. 6 illustrates hardware of a special purpose computing machine configured with a dynamic provisioning process according to one embodiment of the present invention.

FIG. 6 illustrates hardware of a special purpose computing machine configured with a dynamic provisioning process according to one embodiment of the present invention. As mentioned above, the software servers together may form a cluster, or logical network of computer systems programmed with software programs that communicate with each other and work together to process requests. An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

APPENDIX A

Example Agent Implementation

The following illustrates an example implementation of some of the above embodiments.

When an instance is started as a part of a landscape usually some additional steps are needed to reestablish the relations with the other instances in the landscape and adjust some configuration options. The servers that form the landscape may be configured to communicate with each other or have other dependencies so configurations may be changed prior their start to reflect the changes in the environment (in the new landscape instance all servers have new ip addresses, hostnames, etc.). To handle the configuration changes, a landscape agent tool is introduced as part of the OS image of the instance as describe above. The landscape agent may act as a basic framework for applying configuration changes. In some embodiment, the agent may parse the instance startup parameters and call a set of helper shell scripts or java classes to write the values in the configuration files or perform any additional steps needed to start the server as part of the new landscape instance.

Landscape Agent Operations

Landscape agent operations are divided in three parts: first, the agent processes parameters that do not require interaction with outside world (value parameters). Second, the agent processes parameters that require communication with instances of the agent running on other parts of the same landscape (reference parameters). Third, the agent does post-processing.

The agent processes parameters by calling helper scripts. Helper scripts are mini-programs responsible for performing actions depending on the value of the parameter. Agent configuration information contains instructions on which helper script to call for which parameter. One of the required parameters for helper script determines the requested action. Helper scripts can be asked to "save" the parameter value—to do a necessary action in the event of receiving the value of the parameter. Helper script can also be asked to "load" the parameter value—to determine the value for using by some other party. There is no predefined order in which parameters are going to be processed and helper scripts are required to take this into account.

Value parameters are simple name-value pairs. This type of parameters can be used for entities that can be determined at the time of creation of the landscape definition. For example, the web server port is likely to stay constant throughout the lifetime of a web server. Value parameter can be used to describe facts like that.

Reference parameters are parameters that require values to be requested from or saved to other running landscape servers. For example, landscape definition may include a database server and an application server. Application server needs to know the actual IP address of the database server to perform the necessary operations. The actual IP address of the database server cannot be determined before the database server is running. This situation requires usage of a reference parameter of type "get"—the application server needs to "get" address from the database server. It is also possible to initiate communication in other direction: the database server may actively send the address to the application server. This can be accomplished by using a reference parameter of type "put".

Reference parameter consists of parameter name and a reference that allows initiation of communication with a specific agent. In our example above, the reference may be the cloud ID of the database server. After establishing the communication the requesting agent asks the answering agent for the parameter value using the parameter name. The answering agent uses helper scripts infrastructure described above to determine the requested value and send it to the requesting agent. This describes operation for reference parameter of type "get". A parameter of type put will be processed by swapping roles: after establishing the communication the requesting agent asks the answering agent to accept a value for the parameter using the parameter name.

The last part of agent's operations is a post-processing. First, set of check scripts are run to determine that all necessary conditions are met. For example, check script may check that a database server is running and operational. Second, set of post-configuration scripts are run. Post-configuration scripts do finalization of the process after all necessary parameters are set. For example, post-configuration script can initiate the start of a particular application.

Landscape Agent Startup Sequence

When the landscape agent is started it first parses the parameters passed by value (described below) and calls the required helper scripts to save the values in a config files or execute any other preparations. Then, the server part of the agent is started that listens on a port which is the same for all the agents in the cluster (default is 2255). The purpose of this server agent is that the other instances may query for property values that are dynamic and cannot be determined before the instance is started (e.g., ip-addresses, etc.). To avoid cross-dependences between the instances, the server supports the setting of properties by remote instances. To get or set a property value, the server may call the same set of helpers that are used to save/load properties passed by value. After the server part is started, the agent may attempt to resolve from the remote instances the parameter values for parameters that are passed as a reference. At this point only the instance id of the remote instance is know so the agent will try to get the ip-address by calling a cloud system API. As sometimes the instances stay in "pending" for quite a long time and the ip-address is not yet know the agent will keep retrying after 10 sec. delay (retry count is configurable, right now is set to arbitrary high value 1000 as we expect the instance will be started by amazon eventually). Then the agent will try to connect to the agent running on that remote instance and get the value of the parameter. It will retry indefinitely to get the parameter value before it moves to the next one. After local and remote parameters are processed the agent will execute all executable scripts in landscape/check to make sure all conditions to continue startup are met. After checks are completed the agent will execute executable scripts in a landscape/post-config folder in the order they are found in the directory. It is expected that the scripts do not depend on each other or particular order of execution.

The whole landscape sequence may be executed every time the instance is restarted. This is done mostly to support suspend/resume of landscapes (the EBS volume will be the same but the configuration must be edited again as the other instances are now with different addresses) but also implies that all helpers modify the original EBS configuration in non-destructive way so they can update it successfully later. The suspend procedure should be extended to create some marker file in the EBS volume so scripts can distinguish between first startup of an instance and resume operations if they have to. For example the dynamic registration of dialog instances in a CE java cluster image should create the database entry for the dialog instance only on the first run.

The landscape agent and more important the server part of it runs as "root". This may be needed because some of the configuration changes may require root privileges (adding hostnames in /etc/hosts, etc.).

Input received from the network is passed as parameters to scripts (although it is checked for special characters first). So care must be taken when writing scripts and also to secure (firewall) the landscape agent port from external access. The landscape agent itself supports https and authentication that can be used to increase the security when needed.

Passing Configuration Parameters to the Landscape Agent

Startup parameters that are handled by the landscape agent may be described in the landscape definition xml. For example the landscape instance definition:

```
<Server id="NetWeaverCI" imageid="ami-75bf581c:snap-ee22cd87"
description="CE Cluster:Central Instance" >
        <Param name="instance_type" value="ci" />
        <Param name="db_host"
        reference="DatabaseServer" />
</Server>
```

This definition specifies two parameteres: instance_type which is passed by value, and db_host which is passed by reference. Parameters passed by value may be handled directly by a helper scripts. The landscape agent may check a helpers.cfg file to figure out which helper to call for the specific parameter and executes it with the parameter name and value passed as parameters. The same helper potentially can handle multiple related properties. Example:
<Param name="instance_type" value="ci"/>
For parameters that are passed by reference, the landscape agent may first connect to the landscape agent running on the referenced instance to obtain the actual value of the parameter. As instance IDs are not known prior to the start of the instance, the Cloud Controller calculates the dependecies between the instances and launches them in the right order so if an instance has reference to other instances, then they are started first and then their IDs are passed on startup to the dependent instance.

To avoid cross-references there are two types of references defined—put and get. When a parameter with "get" type is used, the landscape agent first connects to the remote landscape agent running on the other instance to obtain the value of the parameter, then passes to the helper scripts to save it in the same way the parameters passed by value are handled.
<Param name="db_host" value="DatabaseServer" type="get"/>
Or (deprecated syntax):
<Param name="db_host" reference="DatabaseServer"/>
"Get" references are used mainly to avoid cross-references between instances. If a "put" reference parameter is specified in the landscape definition the landscape agent will first obtain the value from the local helper scripts, then connect to the remote landscape agent and send the parameter name and value there. The remote landscape agent will handle this parameter as it was passed by value in its own landscape definition entry. Example:
<Param name="hostname.server1.cloud.sap.corp" value="instance2" type="put"/>
In this example the helper script "hostname" will resolve locally the ip address of the host "server1.cloud.sap.corp", and then it will be passed to the remote landscape agent running on instance "instance2" where it may be added to /etc/hosts by the local "hostname" helper script.

In some self-reference parameters may be used. For example, if you need to write the new ip address of the instance to some configuration file, it cannot be passed as value but also cannot be passed as reference since the instance's own id is not known prior its startup. In this case the parameter may be passed by value with a keyword "self_reference". This will make the landscape agent first to call the helper script to load the value and then to save it. Example:
<Param name="sapglobalhost" value="self_reference"/>
In some embodiments, this case may be handled automatically by the Cloud Controller so such parameters can be defined as normal get reference parameters. Image properties may be overriden in the landscape definition. If a parameter passed by value in the landscape definition has the same name as a property defined in the image definition the property will be overwritten with the value from the landscape definition. For example, the provided reference web dispatcher image may have a property http_port in its image definition that allows customization of the http port where the web dispatcher listens for incoming connections. Therefore, to customize the web dispatcher for a landscape to listen on port 8080 you can use the following entry in the landscape definition:

```
<Server id="server0" imageid="ami-c1d532a8"
description="CE cluster:Web Dispatcher" >
  <Param name="ms_host" value="server2" type="get" />
  <Param name="ms_http_port" reference="server2 " type="get" />
  <Param name="http_port" value="8080" />
</Server>
```

With this approach, by using helper scripts and landscape definition parameters, dynamic landscape definitions may be created from a set of generic images.

Another approach for creating static landscape definitions is to use predefined virtual hostnames when installing the server hostname and later when connectivity configuration between the instances is made. When images are created for an installation, the virtual hostnames may be mapped to the current ip addresses of the instances. A helper script may handle this so if instance1 needs to connect to instance2 that has virtual hostname vhost2 and instance3 with virtual hostname vhost3 the definition may be as follows:

```
<Server id="instance1" imageid="ami-75bf581c:snap-ee22cd87"
description="CE Cluster:Central Instance" >
    <Param name="hostname.vhost2" value="instance2" type="get" />
    <Param name="hostname.vhost3" value="instance3" type="get" />
</Server>
```

In approach again some care must be taken during installation and configuration of the source landscape that always the vhosts are used and there are no configurations made that access the other instances directly by IP address or the temporary amazon internal hostnames, etc.

Landscape Agent Configuration

The parameters defined in the landscape definition xml are passed as part of the instance startup properties by the controller and end up in an instance.properties file. To distinguish landscape related properties from the instance image properties the landscape properties are stored as landscape.val.property_name or landscape.ref.property_name, landscape.ref.getproperty_name, landscape.ref.put.property_name. The landscape agent may be started from the script/isa_home/start_landscape_agent.sh. The volume.properties file may be present in the root of the EBS volume and contains properties describing the installation on the EBS volume, such as SAPSYSTEMNAME, INSTANCE_NAME, etc. It is used by the scripts to determine the name and path to the instance profile files, etc. The file is sourced by the script so it must follow property=value format. Example:
EBS SNAPSHOT INFORMATION
SAP SYSTEM
SAPSYSTEMNAME=CGB
SAPADM=cgbadm
INSTANCE_NAME=J00
INSTANCE_NO=00
IMAGE_HOSTNAME=CGB20080909
SCS_NAME=SCS01
SCS_NO=01
MISC
JAVA_HOME=/usr/java/jdk1.5.0_14/
HWADDR=12:23:31:13:31:13
In case of non-EBS installation the script expects the volume.properties file to be placed inside/isa_home.

The landscape agent specific configuration is stored in an agent.cfg file. This file may be generated at runtime by the landscape.sh script based on the properties passed in /isa_home/startup.properties so the landscape agent can be configured by setting the properties on instance startup or in the landscape definition. The following are examples of supported configuration options (agent.cfg property names are in the left side):
accessKey—(starup.properties name: accessKey)—cloud system (e.g. amazon cloud) access key
secretKey—(starup.properties name: secretKey)—cloud system secret key
serverCommand—$ISA_HOME/landscape/landscapeserver.sh—command to start the landscape server
port—(starup.properties name: landscape_agent_port)—port used for landscape agent communication. All landscape agents in the landscape must use the same port. Default is 2255.
protocol—(starup.properties name: landscape_agent_protocol)—protocol that is used for landscape communication. Currently http and https are supported.
retry—(starup.properties name:landscape_agent_retry)—how many times the landscape agent should retry to connect to the cloud system or the remote agent before it gives up. Default value 1000.
auth-(starup.properties name: landscape_agent_auth)—what authentication scheme to use for communication with between the landscape agents. Currently supported are: none—no authentication; basic—http basic authentication (user/pass). Default is none.
user—(starup.properties name: landscape_agent_user)—user to use for basic http authentication
password—(starup.properties name:landscape_agent_password)—password to use for basic http authentication
keystore—(starup.properties name: landscape_agent_keystore)—keystore file to use for https
keystorepass—(starup.properties name:landscape_agent_keystorepass)—password for the keystore
keypass—(starup.properties name:landscape_agent_keypass)—password for the key
trustedcerts—(starup.properties name: landscape_agent_trustedcerts)—used for https certificate verification
Currently by default the same keystore and cert file that are used for the ssltunnel are used for the agent if https is enabled.
Connections through proxy are also supported:
proxyAuth—none|basic|digest|ntlm
proxyHost—proxy hostname/address
proxyPort—proxy port
proxyUser—user in case proxy authentication is used
proxyPassword—password in case proxy authentication is used
proxyNTLMDomain—domain if ntlm auth is used
Helper Scripts The landscape agent may use external helper scripts or java classes to handle the actual configuration. The existing scripts may be stored in a landscape/helpers directory. The helper scripts and classes are described in a config file called helper.cfg inside the landscape directory. The format is "property_name complete_path_to_the_executable" in case script or native application is used as helper and "property_name class_name" in case a java class is used as a helper. "property_name" can be specific name or a regular expression (compatible with the java regex API). The landscape agent will try first to find an exact match for the property name and here is no match will try to match using regexps. The first entry that matches the property name will be used so some care must be taken when editing the config file. When the helper is external script or program the contract is that it must take up to tree command line parameters in the order load|save propertyName [propertyValue]. In case the first parameter is "load" the helper is expected to write to the standard output the value of the property. The contract for helpers implemented as java classes is that the class and any other needed libraries are present in the agent classpath (e.g. by adding them in the landscapeagent.sh script). The class must have a default constructor to implement the com.sap.cloud.landscape.impl.PropertyConfigurator interface.

Post-config Scripts

The subdirectory landscape/post-config contains scripts that may be run after all configuration properties are resolved but before the server software is started (currently this means before $ISA_HOME/start_engine.sh is called). The scripts that are made executable are executed. This allows to have all the available post-config scripts in one place and the helper scripts to set the execute flag only on the scripts that need to be executed based on the property values. Example use case is—in case a dialog instance is started it first must resolve the database server hostname and write it in the configuration but then a post-config script must be executed to create the db entry for the dialog instance Check Scripts.

The subdirectory landscape/check contains scripts that are run after all configuration prarameters (passed by value or by reference) are processed but before the post-config scripts are run or the engine is started. Again only executable scripts are run. Check scripts are used to delay further execution until some condition is met. For example the java server dialog instances must wait until the database and the message server are up and running before they can start successfully.

Creating NetWeaver CE Java Cluster from any CE Standalone Installation Image

Helper scripts may allow creating java cluster landscapes from any CE standalone installation without modifying the scripts or the image but by setting the properties such as SAPSYSTEMNAME, etc in the volume.properties file to the correct values. Based on the parameters in the landscape xml definition then the image can be started as one of:

- Standalone installation (DB+SCS+JXX)—if you don't define any parameters in the landscape definition the instance will start normally as a standalone CE installation. You still might want to use some parameters for example to specify hostnames to be added in /etc/hosts.
- DB only—will execute "startsap db" so only the database server will be started.
- Central instance—this will start the SCS instance and the default JXX java instance on that instance.
- Dialog instance—additional dialog instance will be registered and started.

The type of instance to start is defined by the parameter "instance_type" (or "image_profile") which takes values db|ci|di.

The database host may be passed as parameter to the central and dialog instances using the parameter "db_host". Assuming that the database instance is entered in the definition as "server1" the parameter passed to the central and dialog instances will be:

<Param name="db_host" value="server1" type="get"/>

In a similar way the central instance address must be passed to all dialog instances with the parameter "sapglobal-host". Assuming the central instance is entered in the definition as "server2" the parameter passed to the dialog instances will be:

<Param name="sapglobalhost" value="server2" type="get"/>

Another way is to use the "ci_host" parameter. Assuming the central instance is entered in the definition as "server2" the parameter passed to the dialog instances will be:

<Param name="ci_host" value="server2" type="get"/>

In both cases the parameters are passed as references to the instances as the actual host addresses are not yet known.

For all dialog instances you can pass also an instance number with the parameter "instance_no" for example:

<Param name="instance_no" value="04"/>

If you don't use the instance_no parameter—the next available will be used automatically. Keep in mind that if you specify the instance number you must take care that it is not in use by another instance. Additionally the number of java server processes per instance and the zero admin template for the instance can be passed as parameters with

```
<Param name="server" value="2" />; and
<Param name="za_template"
    value="CE_Complete_Stack_production_full"
/>
```

Additional dialog instances can be added automatically to the cluster based on CPU load.

A web dispatcher based load balancer image can also be added to the cluster. It requires 2 parameters in order to connect to the message server of the cluster:

- ms_host—to specify the host where the message server is running
- ms_http_port—to specify the message server http port that is used by the web dispatcher to connect to the cluster. Assuming that the ci instance is "server2" this would be as follows:

```
<Param name="ms_host" value="server2" type="get" />
<Param name="ms_http_port" value="server2" type="get" />
```

Additionally, you can specify the web dispatcher http port with:

<Param name="http_port" value="8080"/>

Example landscape Definition (1 db server, 1 central instance, 2 dialog instances, 1 web dispatcher):

```
<?xml version="1.0"?>
<Landscape name="Demo Java Cluster Landscape" description="Test various features">
    <Servers>
        <Server id="server1" imageid="ami-1e27c077:snap-3d20ca54" description="CE Cluster:DB Server" >
            <Param name="instance_type" value="db"/>
        </Server>
        <Server id="server2" imageid="ami-1e27c077:snap-3d20ca54" description="CE Cluster:Central Instance" >
            <Param name="instance_type" value="ci" />
            <Param name="sapglobalhost" value="self_reference" />
            <Param name="db_host" value="server1" type="get"/>
        </Server>
        <Server id="server3" imageid="ami-1e27c077:snap-3d20ca54"
```

-continued

```
description="CE Cluster:Dialog Instance" >
            <Param name="instance_type" value="di" />
            <Param name="db_host" value="server1" type="get"/>
            <Param name="sapglobalhost" value="server2" type="get"/>
        </Server>
        <Server id="server4" imageid="ami-1e27c077:snap-3d20ca54"
description="CE Cluster:Dialog Instance" >
            <Param name="instance_type" value="di" />
            <Param name="db_host" value="server1" type="get"/>
            <Param name="ci_host" value="server2" type="get"/>
            <Param name="servers" value="2" />
        </Server>
        <Server id="server0" imageid="ami-4326c12a" description="CE cluster:Web
Dispatcher" >
            <Param name="ms_host" value="server2" type="get" />
            <Param name="ms_http_port" value="server2" type= "get" />
            <Param name="hostname.CGB20080909" value="server1" type="get"/>
            <Param name="http_port" value="8888" />
            <Param name="hostname.webdispatcher" value="server2" type="put" />
        </Server>
    </Servers>
</Landscape>
```

The db server instance is defined with the entry:

```
<Server id="server1"
imageid="ami-1e27c077:snap-3d20ca54" description="CE Cluster:DB
Server" >
        <Param name="instance_type" value="db"/>
</Server>
```

The only parameter here is passed by value: instance_type with value db. This will make the image to start only the database server.

The central instance (SCS+J00 instances) is defined with:

```
<Server id="server2"
imageid="ami-1e27c077:snap-3d20ca54" description="CE Cluster:Central
Instance" >
        <Param name="instance_type" value="ci" />
        <Param name="sapglobalhost"
        value="self_reference" />
        <Param name="db_host" value="server1" type="get"/>
</Server>
```

Again the instance_type parameter is used, this time with value ci. This will make the instance to start as scs+j00. The sapglobalhost parameter passed as self-reference is not really needed as the value is already adjusted by the helper script that handles the instance_type parameter. Included in the definition only as example of a self-reference parameter. As this instance needs to connect to the database server its address is specified with the db_host property that is a get reference to the data base instance entry server1.

A dialog instance is described with the entry:

```
<Server id="server3"
imageid="ami-1e27c077:snap-3d20ca54" description="CE Cluster:Dialog
Instance" >
        <Param name="instance_type" value="di" />
        <Param name="db_host" value="server1" type="get"/>
        <Param name="sapglobalhost"
        value="server2" type="get"/>
</Server>
```

Again the instance_type parameter is used, this time with value di. This will make the instance register itself and start as a dialog instance. As no instance_no parameter is specified in the definition it will use the first available (currently all register as number 02 as only the instance ID is checked to be unique and not the instance number). Again this instance needs to connect to the database server its address is specified with the db_host property that is a get reference to the data base instance entry server1. Dialog instances also need to connect to the message server so the address is specified with the sapglobalhost parameter passed as a reference to the central instance server2.

Another dialog instance is specified with the entry:

```
<Server id="server4"
imageid="ami-1e27c077:snap-3d20ca54" description="CE Cluster:Dialog
Instance" >
        <Param name="instance_type" value="di" />
        <Param name="db_host" value="server1"
        type="get"/>
        <Param name="ci_host" value="server2"
        type="get"/>
        <Param name="servers" value="2" />
</Server>
```

The difference here is that the now deprecated parameter ci_host is used instead of sapgolbalhost. It is used for the same purpose but sapglobalhost now provides a better way to update the configuration. In addition, the image parameter servers is overridden with value 2. This will make the instance to start with 2 java server processes.

A Web Dispatcher is added to the cluster with the entry:

```
<Server id="server0" imageid="ami-4326c12a"
description="CE cluster:Web Dispatcher" >
        <Param name="ms_host"
        value="server2" type="get" />
        <Param name="ms_http_port"
        value="server2" type= "get" />
        <Param name="hostname.CGB20080909"
        value="server1" type="get"/>
        <Param name="http_port" value="8888" />
```

```
<Param name="hostname.webdispatcher"
    value="server2" type="put" />
</Server>
```

The definition uses another image so most of the parameters are different and specific to the web dispatcher configuration. The parameters ms_host and ms_http_port are used to specify the message server host and port where the web dispatcher connects to get load balancing and instance availability information for the cluster. Both are passed as get references to the central instance server2. The parameter hostname.CGB20080909 will create an entry in the web dispatcher instance /etc/hosts file that maps the hostname CGB20080909 to the ip-address of the database server. Given only as example—not really needed for proper operation of this landscape. But you might have to pass it in case you connect the web dispatcher to a stand-alone instance (db+ j00+scs01 in one box). The parameter hostname.webdispatcher will create entry in the central instance /etc/hosts file that maps the hostname webdispatcher to the ip address of the web dispatcher instance. Again used only as example. The parameter http_port overrides the image parameter with the same name and configures the web dispatcher to listen for incoming connections on http port 8888.

What is claimed is:

1. A computer-implemented method comprising causing a computer to execute executable program instructions to perform steps of:
   receiving information, from a sending computer, comprising a landscape definition which identifies a plurality of servers and dependencies between at least some of the servers, the landscape definition received being selected from among a plurality of landscape definitions; and
   for each server specified in the landscape definition received:
      retrieving a server image from a repository of previously stored server images, the server image being identified based on information in the landscape definition associated with said each server; and
      instantiating said each server on the cloud computing system including causing the retrieved server image to execute on the cloud computing system,
   wherein the sending computer performs steps of:
      generating a landscape instance;
      receiving a landscape command directed to the landscape instance;
      mapping the landscape command to a plurality of server commands corresponding to the plurality of servers in the landscape definition; and
      executing the server commands on the plurality of servers on the cloud computing system.

2. The method of claim 1 wherein the plurality of servers are instantiated in response to a single command from a user to create a corresponding landscape.

3. The method of claim 1 wherein the specified dependencies include a startup sequence of two or more of the servers, and wherein instantiating the plurality of servers comprises instantiating two or more servers according to the startup sequence.

4. The method of claim 1 further comprising assigning the instantiated plurality of servers corresponding to the landscape definition a unique identifier, storing the unique identifier in a database, and associating the unique identifier with information about the instantiated plurality of servers.

5. The method of claim 1 wherein each image further includes an agent software program, the agent establishing communication between the cloud computing system and a local computing system.

6. The method of claim 5 wherein the agent coordinates communications between the servers during a startup procedure.

7. The method of claim 1 wherein the information comprising the landscape definition is stored on a local computing system, and wherein the landscape definition associates a plurality of servers with a landscape identification and, for each server, specifies different server configuration parameters to be used in instantiating the plurality of servers on the cloud computing system.

8. The method of claim 1 further comprising storing, on a local computing system, the information comprising the landscape definition, wherein the landscape definition comprises, for each server in the landscape definition, a server identification, an image identification which specifies an image on the cloud computing system to be instantiated, and one or more server specific parameters to instantiate the different servers.

9. A non-transitory computer readable storage medium embodying a computer program which, when executed by a computer, will cause the computer to perform a method of generating cloud computing landscapes, said method comprising:
   receiving information, from a sending computer, comprising a landscape definition which identifies a plurality of servers and dependencies between at least some of the servers, the landscape definition received being selected from among a plurality of landscape definitions; and
   for each server specified in the landscape definition received:
      retrieving a server image from a repository of previously stored server images, the server image being identified based on information in the landscape definition associated with said each server; and
      instantiating said each server on the cloud computing system by executing the retrieved server image on the cloud computing system,
   wherein the sending computer performs steps of:
      generating a landscape instance;
      receiving a landscape command directed to the landscape instance;
      mapping the landscape command to a plurality of server commands corresponding to the plurality of servers in the landscape definition; and
      executing the server commands on the plurality of servers on the cloud computing system.

10. The computer readable storage medium of claim 9 wherein the plurality of servers are instantiated in response to a single command from a user to create a corresponding landscape.

11. The computer readable storage medium of claim 9 wherein the specified dependencies include a startup sequence of two or more of the servers, and wherein instantiating the plurality of servers comprises instantiating two or more servers according to the startup sequence.

12. The computer readable storage medium of claim 9 further comprising assigning the instantiated plurality of servers corresponding to the landscape definition a unique identifier, storing the unique identifier in a database, and associating the unique identifier with information about the instantiated plurality of servers.

13. The computer readable storage medium of claim 9 wherein each image further includes an agent software program, the agent establishing communication between the cloud computing system and a local computing system.

14. The computer readable storage medium of claim 13 wherein the agent coordinates communications between the servers during a startup procedure.

15. The computer readable storage medium of claim 9 wherein the information comprising the landscape definition is stored on a local computing system, and wherein the landscape definition associates a plurality of servers with a landscape identification and, for each server, specifies different server configuration parameters to be used in instantiating the plurality of servers on the cloud computing system.

16. The computer readable storage medium of claim 9 further comprising storing, on a local computing system, the information comprising the landscape definition, wherein the landscape definition comprises, for each server in the landscape definition, a server identification, an image identification which specifies an image on the cloud computing system to be instantiated, and one or more server specific parameters to instantiate the different servers.

17. A computer system comprising:
one or more processors;
a network interface configured to couple the computer system to a cloud computing system through a network; and
a controller software program, executable on said computer system, the controller software program configured to send information comprising a landscape definition which identifies a plurality of servers and dependencies between at least some of the servers, the landscape definition received being selected from among a plurality of landscape definitions,
wherein the controller software program sends instructions through the network interface to the cloud computing system to access a repository of previously stored server images stored on the cloud computing system; and
for each server specified in the landscape definition sent:
a server image is retrieved from the repository of previously stored server images using identification information in the landscape definition associated with said each server; and
said each server is instantiated on the cloud computing system by executing the retrieved server image on the cloud computing system,
wherein the sending computer performs steps of:
generating a landscape instance;
receiving a landscape command directed to the landscape instance;
mapping the landscape command to a plurality of server commands corresponding to the plurality of servers in the landscape definition; and
executing the server commands on the plurality of servers on the cloud computing system.

18. The computer system of claim 17 wherein the plurality of servers are instantiated in response to a single command from a user to create a corresponding landscape.

* * * * *